UNITED STATES PATENT OFFICE.

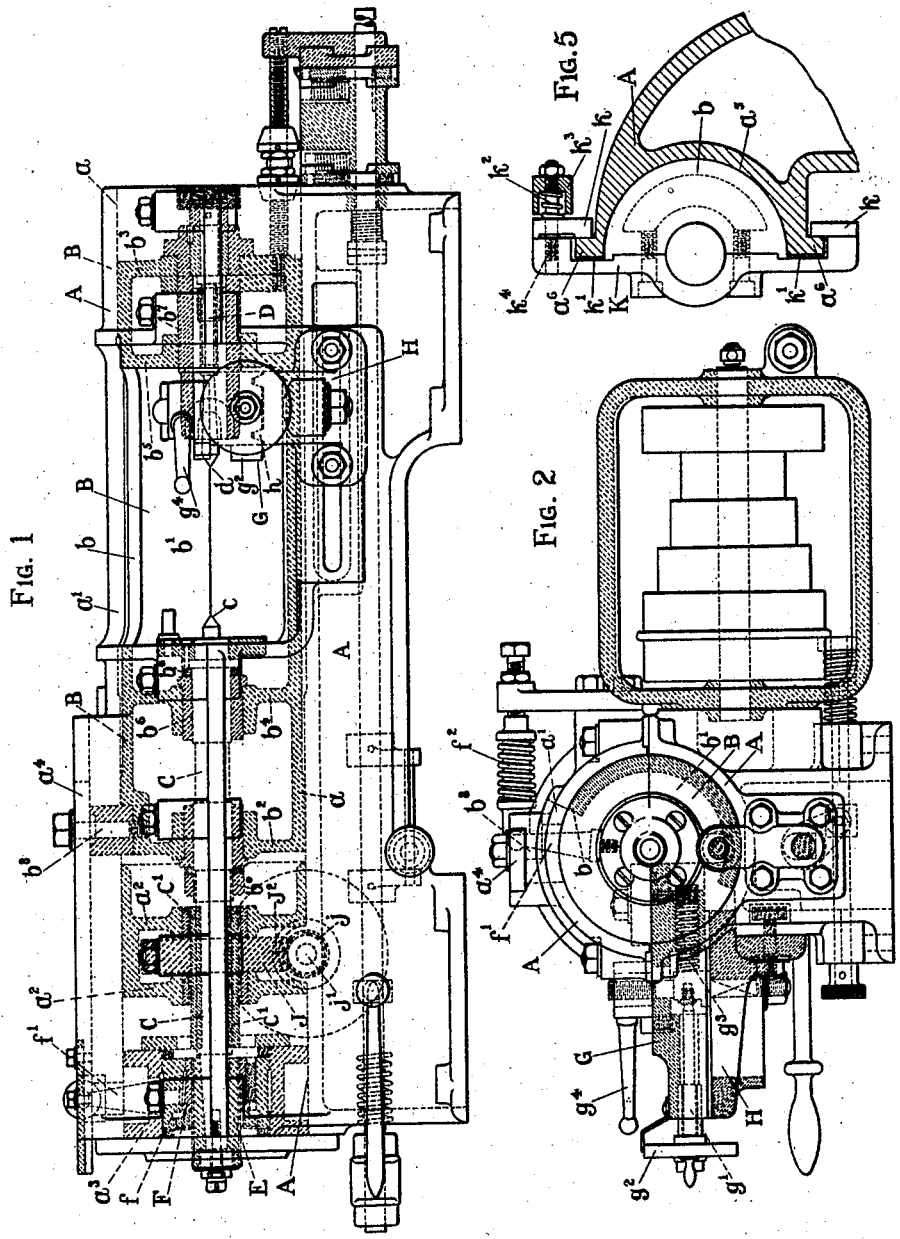

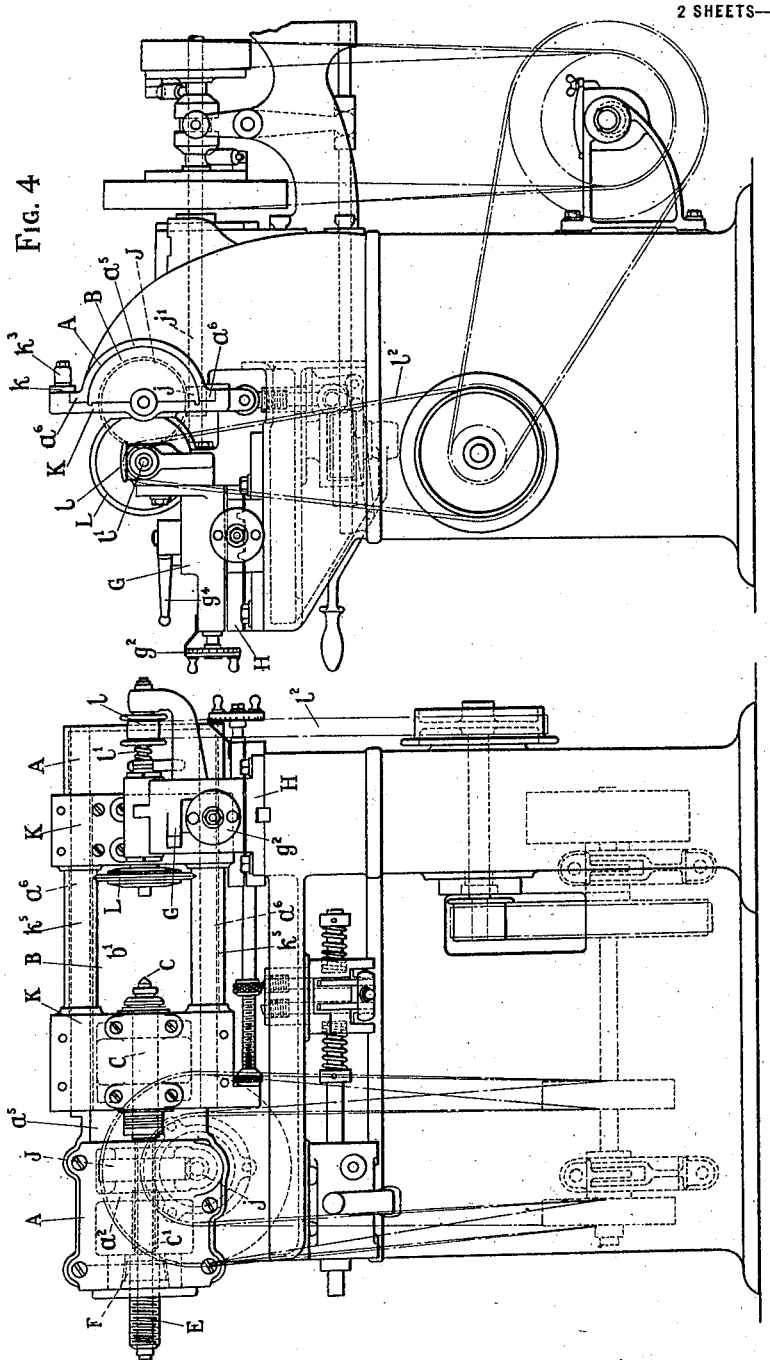

ARTHUR DRUMMOND, OF RYDE'S HILL, NEAR GUILDFORD, ENGLAND, ASSIGNOR TO THE BIRMINGHAM SMALL ARMS COMPANY LIMITED, OF SMALL HEATH, BIRMINGHAM, ENGLAND.

LATHE.

1,402,582. Specification of Letters Patent. Patented Jan. 3, 1922.

Application filed May 6, 1920. Serial No. 379,371.

(GRANTED UNDER THE PROVISIONS OF THE ACT OF MARCH 3, 1921, 41 STAT. L., 1313.)

*To all whom it may concern:*

Be it known that I, ARTHUR DRUMMOND, a subject of the King of Great Britain and Ireland, residing at Ryde's Hill, near Guildford, in the county of Surrey, England, have invented certain new and useful Improvements in or Relating to Lathes, (for which I have filed applications in Great Britain June 26, 1917, Patent #116,174; France July 8, 1920, #519,406, and Belgium July 9, 1920, #231,197,) of which the following is a specification.

This invention relates to lathes and more especially to screw cutting or grinding lathes for accurate work and has for its chief object to provide a new construction by which certain errors generally occurring in lathes can be eliminated.

According to this invention the mandrel and tail stock are mounted in a cylindrical or part cylindrical lathe body sliding within an outer casing of corresponding form and provided with an opening for a stationary tool past which the lathe body with the work is caused to move. In the case of a semi-cylindrical body and casing the latter is formed with longitudinal guides at top and bottom and flanged vertical plates belonging to the body engaged over the said guides, a spring or springs keeping the surfaces in close contact. The mandrel may be secured at its back end to a coxial master screw working in a nut which may be fixed at the end of the casing but for accurate work is rotatable under the control of a compensator which corrects for inaccuracies found experimentally in the master screw and nut. The mandrel is driven through worm or other suitable gearing and slides through a worm wheel or gear wheel to which it is keyed, the wheel being held in place between two fixed plates.

The sliding lathe body carries the tail stock and the mandrel bearings, the work being situated in an intervening space to which access is permitted for insertion of the work and to allow the end of the cross slide with the tool to reach the work. There is of course no main slide, the cross slide being mounted upon a fixed table.

Since the drive, the master screw and the work are all coaxial and the tool is stationary there are no opportunities for error to occur between the screw and the work and rotary movement of the cylindrical lathe body has no effect, although the body is prevented from rotation in order that it may not foul the cross slide. The master screw and mandrel form practically one member but the screw is replaceable so that a screw of any desired pitch can be fitted. The semi-cylindrical construction is especially suitable for grinding apparatus where a rotating grinding wheel serves as the tool, as the sliding parts can be readily protected against the entry of grit by covering over the edges of the meeting surfaces of the body and casing, and the yielding mounting of the body moreover prevents any grit which may enter interfering with the operation of the lathe, while in the closely fitting cylindrical mounting the entry of grit might give rise to considerable trouble.

In order that the said invention may be clearly understood and readily carried into effect I will describe the same more fully with reference to the accompanying drawings, in which:—

Figure 1 is a front elevation of the lathe provided with a cylindrical body and outer casing, the body and more important inner parts being marked with dotted section lines to show the construction more clearly.

Figure 2 is an end elevation of the lathe also with some of the parts shown in dotted section.

Figures 3 and 4 are respectively a front and an end elevation of a modified construction employing a semi-cylindrical lathe body; and Figure 5 is a detail section to a larger scale of part of the modified apparatus.

A is the outer casing. B is the cylindrical or semi-cylindrical lathe body. C is the mandrel. D is the tail stock. E is the master screw. F is the nut in which the said screw works. G is the cross slide adjustable on the fixed table H belonging to the casing A.

Referring to the construction illustrated in Figures 1 and 2 the lathe body B is of cylindrical form and slides within the cylindrical chamber *a* of the casing A, the casing and the body being provided with the openings *a'* and *b* allowing of access to the inner space *b'* in which the work is placed upon the centers $c$ and $d$ of the mandrel and tail stock, the tool and the cross slide G extending into this space through the large front openings $a'$ and $b$.

The body B is provided with the end webs $b^2$, $b^3$ and the intermediate webs $b^4$, $b^5$, between the latter extending the work space $b'$. The webs $b^2$ and $b^4$ are provided with bearings $b^6$ for the mandrel C, which engages the bearings through the collars $b^*$ fixed on the mandrel, and the opposite webs $b^3$, $b^5$ with a bearing $b^7$ for the tail stock, the bearings engaging the webs so that the body, mandrel and tail stock slide together. The mandrel C and the master screw E are rigidly connected together to form a single member, the screw however being replaceable. The mandrel C and screw are driven through the keys $c'$ by the worm wheel J mounted upon the mandrel between the webs $a^2$ belonging to the casing A so that the worm wheel is held from axial movement while the mandrel and keys can slide axially through it. The worm wheel J is driven by the worm $j$ of the cross shaft $j'$ forming part of the driving gear of the lathe.

The nut F is shown of conical form and may be fixed in the web $a^3$ at the end of the casing A through the sleeve $f$ or the nut and sleeve may be free to turn under the control of a compensator to allow for irregularities in the master screw, but usually the said compensation is not required as the master screw can be made with great accuracy and the construction of the lathe prevents any inaccuracies arising between the master screw and the work. The compensator acts through the arm $f'$ on the sleeve $f$ against the pressure of the spring $f^2$.

The general operation of the lathe is as follows:—

The work is fitted between the centres $c$ and $d$ in the space $b'$ of the body B, into which space the end of the cross slide G can extend so as to enable the cutting or other tool to reach the work. After adjustment of the cross slide on the guides $h$ of the table H by means of the micrometer screw $g'$ and wheel $g^2$ acting against the spring $g^3$, the slide is locked in place by the locking handle $g^4$ and the slide then remains stationary for a complete cut. On starting the lathe the mandrel C is rotated, carrying around the master screw E, the latter screwing through the nut F and moving the mandrel together with the body longitudinally at a speed depending upon the pitch of the screw. The mandrel and tail stock carry the work past the tool belonging to the fixed cross slide G and a screw thread is cut. After each cut the work is brought back to its initial position and the cross slide G is again adjusted by the micrometer for a fresh cut, the operations being repeated until the complete thread is formed.

Owing to the fact that the mandrel forms a continuation of the master screw, movement of the work follows exactly the pitch of the screw and there are no intermediate parts which might cause irregularities to arise, so that screws of extreme accuracy may be readily made. It will be seen that as the lathe body acts merely as a support for the mandrel and tail stock and the latter are coaxial with the master screw the work cannot be disturbed by any rotation of the body, although of course substantial rotation is prevented by suitable means such as the stud $b^8$ sliding in the guiding part $a^4$ of the casing A.

Referring to the modification shown in Figures 3, 4 and 5 the body B forms only half a cylinder and the casing is provided with a semi-cylindrical chamber $a^5$ accurately fitting the body. The latter is held in position by means of the vertical plates K flanged at top and bottom and provided with the guiding lips $k$ extending over the longitudinal guiding lips $a^6$ on the front of the casing A. Between the plates and the front of the casing a small clearance $k'$ is allowed and the body is held in place in a yielding manner by the springs $k^2$ acting against the heads $k^3$ on the screws $k^4$ secured to the upper end of each plate K, the spring $k^2$ bearing on the back of the upper lip or bar $k$ (see Figure 5). This arrangement insures effective guiding of the body but allows for slight rotation against the resilient pressure of the spring, such rotation, as in the case of the cylindrical body already described, having no effect upon the accuracy of the lathe.

The plates K are bolted on the front face of the semi-cylindrical body and form part of the bearings for the mandrel and tail stock spindle, taking the place of the body webs in the previous construction.

The semi-cylindrical construction is especially adapted for a lathe provided with a grinding wheel such as L mounted upon the cross slide G, the wheel being driven through the pulley $l$ and shaft $l'$ by the belt $l^2$ leading to suitable belt gearing driven by the driving gear of the lathe.

The operation of this modified construction is substantially the same as that of the cylindrical lathe already described, the work being placed on the centers in the space $b'$ of the body B, this space being entirely open owing to the semi-cylindrical form of the body. The grinding wheel L is driven at a high speed and may be provided with controlling apparatus of known type so that it is maintained of accurate form.

As a grinding wheel produces grit it is desirable to protect the body from the entry of grit between it and the semi-cylindrical surface of the casing A and for this purpose covering strips or plates $k^5$ may extend between the carrying plates K across the upper edges of the body and casing so that the joint between the body and casing is completely covered in. As before, the rotation of the mandrel C causes the master screw E to screw through the nut F and move the mandrel, work and tail stock across the edge of the griding wheel L, after each operation the cross slide G carrying the grinding wheel being adjusted for a fresh operation. The grinding lathe is suitable for grinding screws where extreme accuracy is required.

What I claim as new and desire to secure by Letters Patent is:

1. A lathe comprising a stationary outer casing having a guideway therethrough of circular cross section, a lathe body comprising a wall of curvature corresponding to that of the guideway arranged to slide in said guideway, a mandrel and tail-stock carried within said lathe body, spaced to receive work therebetween, said body being provided with an opening adjacent the spaced ends of said mandrel and tail-stock and a stationary tool in the path of said opening.

2. A lathe comprising a stationary outer casing, having a guideway therethrough of curved cross section, a lathe body comprising a wall of curvature corresponding to that of the guideway arranged to slide in said guideway, a mandrel and tool stock carried within said lathe body spaced to receive work therebetween, a master screw secured to the mandrel and coaxial with said body, a master nut carried by the outer casing and engaging said screw said body being provided with an opening adjacent the spaced ends of said mandrel and tail-stock and a stationary tool in the path of said opening.

3. A lathe comprising a stationary outer casing having a semi-cylindrical guideway, a semi-cylindrical lathe body slidable within said guideway, means for holding said semi-cylindrical body against rotation in its guideway, means for holding work within said semi-cylindrical body, said body being provided with an opening adjacent said work holding means for exposing said work, and a stationary tool in the path of said opening.

4. A lathe comprising a stationary outer casing having a semi-cylindrical guideway, a semi-cylindrical lathe body slidable in said guideway, a front plate for said body, cooperating guide means on said outer casing and front plate for holding said body against rotation and resilient means for keeping the cooperating surfaces of said guide means in contact.

5. A lathe comprising a stationary outer casing, having a guideway of curved cross section, a lathe body comprising a wall having a curvature corresponding to that of the guideway and arranged to slide in said guideway, a mandrel and tail-stock carried within said body and spaced apart to receive work therebetween, a master screw secured to said mandrel and co-axial with said body, a master nut carried by the stationary casing and engaging said screw, a rotatable gear carried by the outer casing and splinably mounted on said mandrel, means for driving said gear, said lathe body being provided with an opening adjacent the spaced ends of said mandrel and tail-stock and a stationary tool in the path of said opening.

In testimony whereof I have hereunto set my hand in the presence of two subscribing witnesses.

ARTHUR DRUMMOND.

Witnesses:
  J. EUSTACE,
  A. C. IVES.